Sept. 16, 1941. J. R. STOCKSTILL 2,256,416
VALVE
Filed March 31, 1941
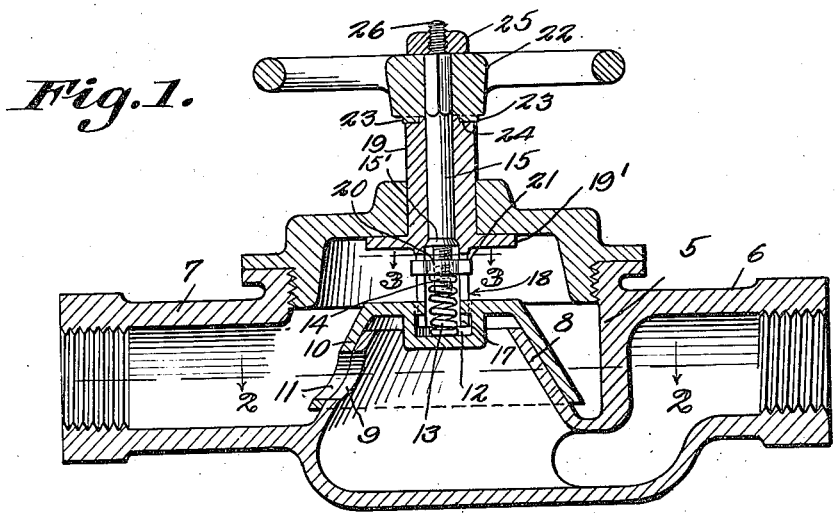
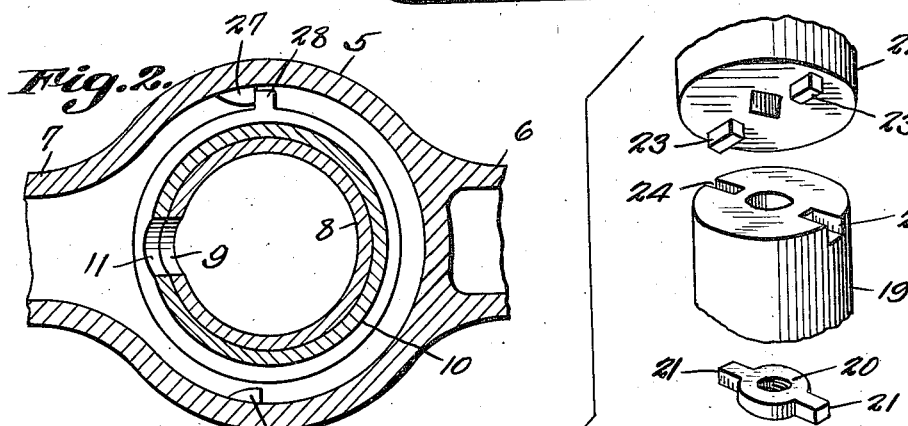
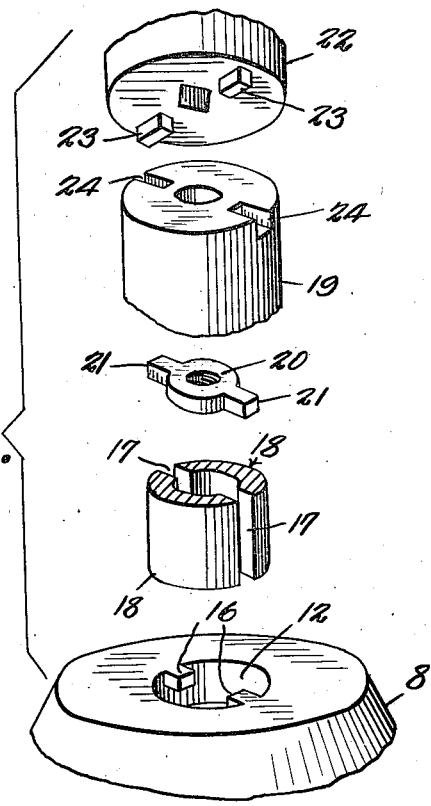
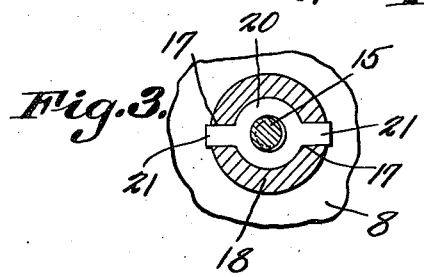
J. R. Stockstill INVENTOR.
BY
ATTORNEYS.

Patented Sept. 16, 1941

2,256,416

UNITED STATES PATENT OFFICE 2,256,416

VALVE

Jesse R. Stockstill, Sacramento, Calif.

Application March 31, 1941, Serial No. 386,157

3 Claims. (Cl. 251—112)

This invention relates to valves, the primary object of the invention being to provide a valve for universal use, but primarily designed in controlling the flow of steam or hot oil, through pipelines.

An important object of the invention is to provide a valve of this character which will be permitted to move vertically with respect to the valve stem, thereby eliminating sticking of the valve, due to expansion caused by heat.

Another object of the invention is the provision of a spring connection between the valve and valve stem, said spring adapted to urge the valve to its seat, insuring a close fit between the valve and its seat, with the result that the necessity of grinding the valve is eliminated.

A still further object of the invention is to provide means whereby the tension of the spring may be readily regulated without the necessity of removing the valve from the housing.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is a longitudinal sectional view through a valve and valve seat, constructed in accordance with the invention.

Figure 2 is a sectional view taken on line 2—2 of Figure 1.

Figure 3 is a sectional view taken on line 3—3 of Figure 1.

Figure 4 is a view illustrating the various elements of the valve stem and valve proper, as disconnected.

Referring to the drawing in detail, the valve housing is indicated generally by the reference character 5 and is provided with an extension 6 at one side thereof, the extension 6 being formed with internal threads, for the reception of a threaded pipe.

At the opposite side of the valve housing is an extension 7, which is the inlet side of the valve, the extension 7 being also formed with internal threads for the reception of the threaded end of an inlet pipe, not shown.

Extending upwardly within the housing is a frusto-conical valve seat 8 formed with an inlet opening 9, the bottom of the valve seat being open and in communication with the extension 6, so that steam or oil, passing through the opening 9, may find its way into the extension and into the pipe connected therewith.

The valve is indicated by the reference character 10 and being substantially cone-shaped, readily fits over the valve seat 8. The valve is also formed with an opening indicated at 11 which is adapted to align with the opening 9, permitting steam or oil to pass into the valve seat, from the extension 7.

A depression indicated at 12 is formed in the upper end of the valve 10, and this depression provides a seat for the coiled spring indicated at 13, the upper end of the spring being positioned over the threaded end 14 of the rod 15. Lugs indicated at 16 extend inwardly from the wall of the depression 12, and engage within the slots 17 formed in opposite sides of the extension 18 that extends from the valve shank 19. The valve shank 19 is hollow, and the rod 15 is so constructed that it extends through the shank, there being provided a tapered collar 15' on the rod 15, which is urged upwardly by the spring 13, holding the flange 19' against the valve housing.

A wide annular flange 19' is formed at the lower end of the valve shank 19, the flange 19' being held into engagement with the valve housing by the spring 13. Thus it will be seen that the flange 19' acts as a packing gland. Positioned on the threaded end 14 of the rod 15, is a nut indicated at 20, which nut bears against the upper end of the coiled spring 13 to tension the spring, as the rod 15 is rotated independently of the valve shank 19. In order that the nut 20 will be held against rotary movement as the rod 15 is rotated to adjust the screw, ears 21 are provided on the nut 20, the ears 21 extending through the slots 17 of the extension 18.

As clearly shown by Figure 1 of the drawing, the upper end of the rod 15 is square in cross-section to fit a square opening formed in the hand-wheel 22, which is used to operate the valve. Lugs 23 extend downwardly from the hub of the hand-wheel 22, and engage in recesses 24 formed in the upper end of the valve stem 19, with the result that as the hand-wheel 22 is rotated, rotary movement will be imparted through the valve stem, to the valve 10.

A nut indicated at 25 is positioned on the threaded extension 26, formed at the upper end of the rod 15, and acts to urge the hand-wheel into close engagement with the valve stem 19. Should it be desired to compress the spring 13 to increase the pressure of the valve against the seat, it is only necessary to loosen the nut 25 and pull the hand-wheel away from the valve stem 19, until the lugs 23 thereof disengage the recessed portions of the valve stem. The hand-wheel may now be rotated, causing the nut 20 to be fed against the upper end of the coiled spring, increasing the tension. After the proper tension has been provided, the hand-wheel 22 is forced downwardly causing the lugs 23 to again seat within the recesses 24. The nut 25 is now tightened and the valve is again connected with the valve stem to rotate therewith but permitted to move vertically, independently of the valve stem.

In order that the valve 10 will be restricted in its rotary movement, and so that the operator may determine when the valve has been properly rotated to open the valve or close the valve, a lug indicated at 27 is provided within the valve housing and disposed in the path of travel of the lug 28, extending from the valve 10, adjacent to the lower edge thereof.

By considering Figure 2 of the drawing, it will be seen that these lugs provide stops, limiting the rotary movement of the valve.

It will also be noted that while the valve is restricted in its rotary movement, the valve may also move vertically with respect to its valve seat, independently of the valve stem 19, to the end that expansion of the valve, due to heat, will be taken up by the movement of the valve spring, eliminating the possibility of the valve sticking.

Since the valve 10 is pressed closely into engagement with its valve seat, all foreign matter which would tend to cause leakage of the valve, will be removed, when the valve is rotated by the handwheel 22.

What is claimed is:

1. A valve comprising a housing, inlet and outlet pipes communicating with the housing, a valve seat having an opening, mounted within the housing, a valve fitted over the valve seat and having an opening adapted to register with the opening of the valve seat whereby fluid may pass through the valve housing, said valve having a recess in the upper end thereof, lugs extending into the recess, a rotary valve stem extending into the housing and having a slotted inner end extending into the recessed portion of said valve, said lugs extending into the slots of the stem whereby rotary movement of the stem produces a rotary movement of the valve, opening and closing said valve, a rod extending through the valve stem, a coiled spring disposed between the end of the rod and valve and adapted to exert pressure on said valve holding the valve to its seat, and means at the lower end of the rod and operated by said rod for adjusting the tension of said spring.

2. A valve comprising a housing, inlet and outlet pipes communicating with the housing, a frusto-conical valve seat formed within the housing and having its upper end open, said valve seat having an opening in the wall thereof, a frusto-conical hollow valve member fitted over the valve seat and having its upper end closed, said valve having an opening in the wall thereof adapted to register with the opening of the valve seat whereby fluid may pass through the valve housing, a valve stem extending into the housing, means for connecting the valve to the valve stem for vertical sliding movement on said valve stem, said connecting means adapted to rotate the valve when the valve stem is rotated, a spring member disposed within the valve stem and resting on the valve, said spring member adapted to urge the valve to its seat, and means extending into the valve stem for adjusting the tension of said valve.

3. A valve comprising a housing, inlet and outlet pipes communicating with the housing, a tapered valve seat within the housing, a tapered valve mounted on the valve seat and adapted to control the passage of fluid through the housing, a hollow valve stem extending into the housing, connecting means between the valve stem and valve whereby said valve is rotated as the valve stem is rotated, said connecting means including lugs extending from the valve and operating in slots formed longitudinally of said valve stem, a coiled spring resting on the valve and disposed within the valve stem, and means carried by the valve stem for adjusting the tension of the spring.

JESSE R. STOCKSTILL.